Jan. 2, 1951 G. WOOD 2,536,897
REVERSIBLE TRANSMISSION GEAR FOR
MARINE ENGINES AND THE LIKE
Filed Aug. 6, 1947 3 Sheets-Sheet 1

Inventor
GEORGE WOOD
By Haseltine Lake & Co.
Agents

Jan. 2, 1951     G. WOOD     2,536,897
REVERSIBLE TRANSMISSION GEAR FOR
MARINE ENGINES AND THE LIKE
Filed Aug. 6, 1947     3 Sheets-Sheet 2
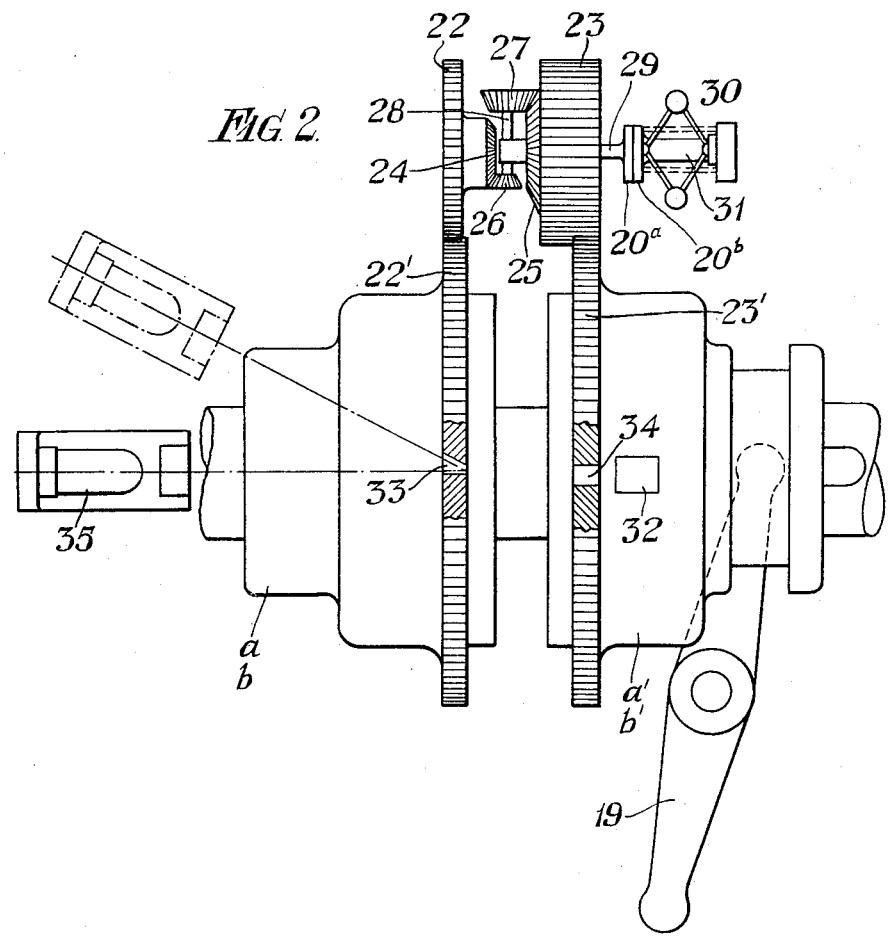
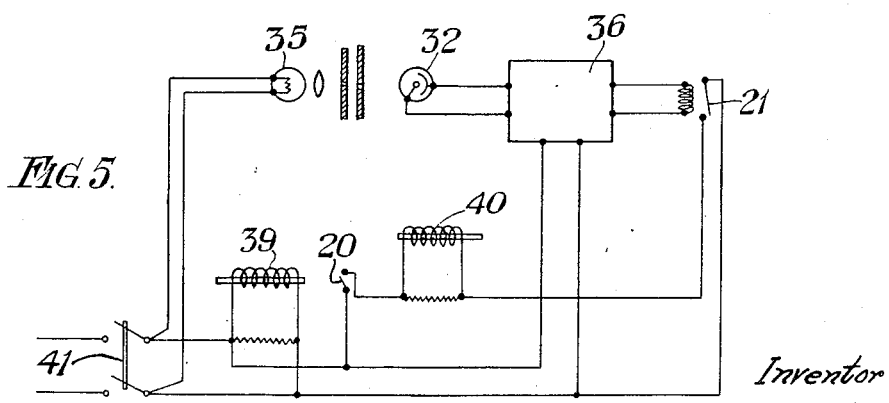
Inventor
GEORGE WOOD
By Haseltine, Lake & Co.
Agents Jan. 2, 1951   G. WOOD   2,536,897
REVERSIBLE TRANSMISSION GEAR FOR
MARINE ENGINES AND THE LIKE
Filed Aug. 6, 1947   3 Sheets-Sheet 3

Inventor
GEORGE WOOD
By Haseltine, Lake & Co.
Agents

Patented Jan. 2, 1951

2,536,897

UNITED STATES PATENT OFFICE 2,536,897

REVERSIBLE TRANSMISSION GEAR FOR MARINE ENGINES AND THE LIKE

George Wood, London, England, assignor to Vickers-Armstrongs Limited, London, England, a company of Great Britain Application August 6, 1947, Serial No. 766,556
In Great Britain July 18, 1946

Section 1, Public Law 690, August 8, 1946
Patent expires July 18, 1966

7 Claims. (Cl. 74—472)

This invention relates to reversible transmission gear for marine engines and the like, and primarily is concerned with the provision of a transmission gear in which changes in direction of rotation of the output or propeller shaft is obtainable while employing a unidirectional rotating prime mover. For example, in its most apt form, the present invention is applicable to marine engine transmission gear which enables a gas turbine running in one direction to drive the propeller shaft selectively ahead or astern. The primary object of the present invention is to obtain a proper synchronism of co-operating interengaging clutch elements of a reverse gear automatically with contemporaneous braking of the prime mover or turbine during operation of the transmitting gear for obtaining a reverse.

According to the present invention, a marine engine or like transmission gear, in which the engine drives the propeller shaft or its equivalent through gearing, is characterised in that the said gearing has combined therewith means for obtaining a reverse in direction of rotation of the propeller shaft whilst having a unidirectional normal driving rotation of the power shaft of the prime mover, the said means being actuated through the medium of actuating means with which is provided means automatically rendering such actuating means effective only when appropriate elements of the transmission to be coupled to produce the normal drive from the power unit are rotating in synchronism.

In order that the invention may be clearly understood and readily carried into effect drawings are appended hereto illustrating embodiments thereof, and wherein:

Figure 2 is a detail side elevation of one of the clutches;

Figure 5 is a diagram of the control circuit for use with the form of synchronising means shown in Figure 4.

Figure 1:
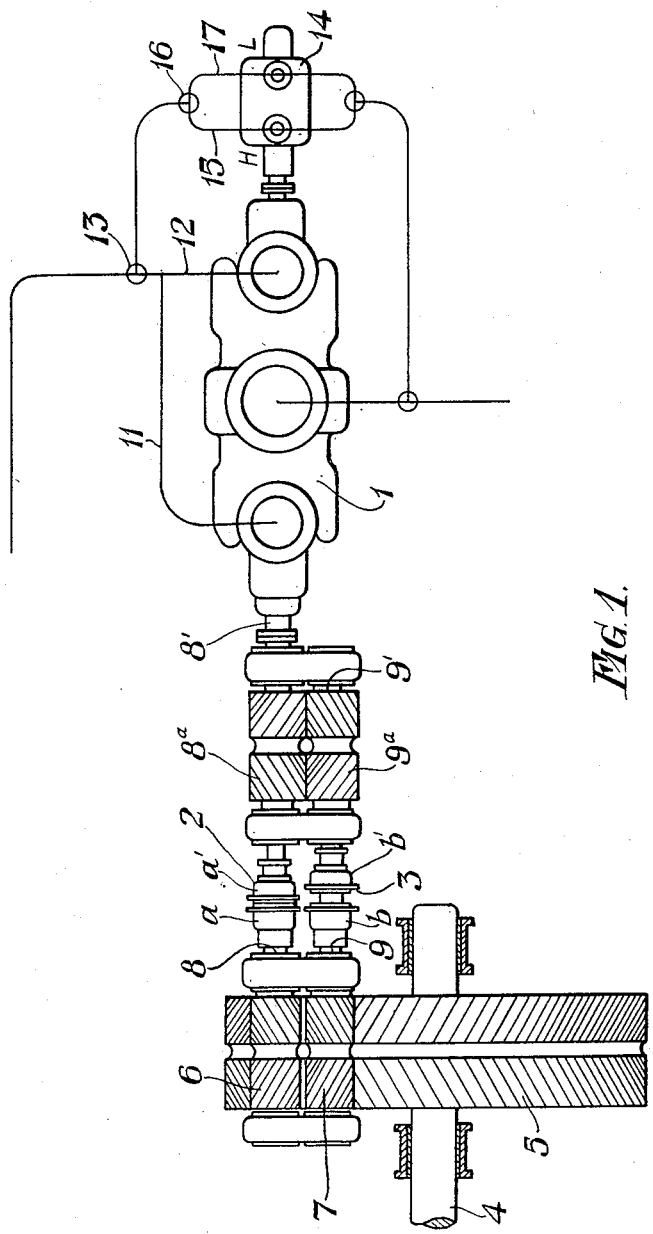
Figure 1 is a somewhat diagrammatic view of an embodiment in which the power unit, shown as a turbine, has associated with it an air compressor.
Figure 3:
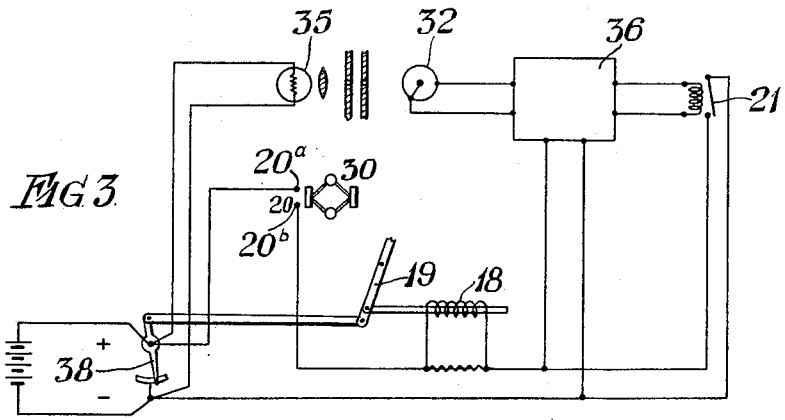
Figure 3 is a diagram of the control circuit of the apparatus shown in Figure 1.

Referring to Figures 1, 2 and 3 of the drawings, the prime mover is a gas turbine 1 driving the propeller shaft 4 through the medium of gearing incorporating two clutches 2 and 3, the gearing preferably being of the helical type and comprising a driven wheel 5 carried by the propeller shaft 4 and with which meshes a pair of helical pinions 6 and 7 on one end of two parallel shafts 8 and 9 respectively, the ratio of these pinions to the gear wheel being such as to produce a big reduction in drive to the propeller shaft. The other ends of these two shafts 8 and 9 carry the clutch elements $a$ and $b$ of the clutches 2 and 3 co-operating with clutch elements $a'$, $b'$ of a pair of co-axial shafts 8', 9' in permanent driving engagement with each other through the medium of constantly meshing helical gear wheels 8$a$ and 9$a$, the shaft 8' being driven directly from the gas turbine rotor shaft and adapted, when its clutch 2 is engaged, to operate as the normal or "ahead" shaft.

The two clutches 2 and 3 are interposed between the pinions 6, 7 meshing with the gear wheel of the propeller shaft and the pinions 8$a$, 9$a$ on the shaft elements 8', 9' disposed nearer the gas turbine, so it will be evident that by de-clutching the clutch 2 of the ahead shaft, and engaging the other clutch 3, a reverse drive will be obtained, that is, to say a change from an "ahead" to "astern" is obtained by a simple de-clutching and clutching operation.

It is evident that straightforward clutching and de-clutching cannot be effected without giving consideration to the torque reaction on the gas turbine, and consequently the present invention contemplates the provision of means to produce a braking action on the turbine contemporaneously with an automatic synchronizing of the appropriate clutch elements. For this purpose, if when the turbine 1 is driving the ship in the ahead direction it is desired to drive astern, the gas supplied to the turbine through the normal conduits 11, 12 is cut off by hand at valve 13 and the clutch 2 of the ahead shaft 8 is dis-engaged by hand, following which the clutch 3 of the astern shaft 9 is engaged, provision being made whereby such engagement only takes place when the appropriate clutch or coupling elements are running in synchronism thereby relieving the transmission gear from shock due to engaging relatively rotating elements. Likewise, it is necessary to produce a braking action on the turbine when the gas supply is cut off and the ahead coupling or clutch is dis-engaged, and for this purpose an axial flow air compressor 14 is provided with the turbine and may form part of the gas producing section of the propelling machinery, such compressor being connected to the turbine rotor shaft at the end remote from the transmission gearing. This braking action is obtained by admitting gas to the high pressure end H of the compressor via conduit 15 through hand operated control valve 16, and when the momentum of the turbine and compressor rotors have been absorbed, the gas is diverted by adjustment of the valve 16 from the high pressure end to the lower pressure end L of the compressor via conduit 17, with the result that owing to the low pressure side of the air compressor reacting in reverse to the high pressure side, the turbine will be rotated in the opposite direction which will result in the clutch element b' being driven in the same direction as its associated clutch element b, the latter at this stage being compelled to conform with the ahead direction of rotation of the propeller which is still rotating in the ahead direction due to the way of the ship. As the compressor builds up speed ultimately the speeds of the coaxial shaft elements 9, 9' of the astern shafting will become equal to bring the two clutch elements b, b' into synchronism, whereupon the clutch 3 is engaged. Gas supply to the compressor is then cut off by valve 13 and admitted to the turbine to first bring the turbine to rest and later drive it in its ahead direction, and through the pinion 7 of the astern shafting, driving the gear wheel 5 of the propeller shaft 4 in the astern direction.

Conversely, if it is desired to alter the drive from astern to ahead, the gas supply to the turbine is cut off as aforesaid and the clutch 3 of the astern shafting disengaged by hand, gas being admitted to the compressor 14 until the turbine is first brought to rest and afterward rotated in the opposite direction to a speed which will synchronise with the speed of the part 8 of the ahead shafting in positive driving connection with the gear wheel 5 of the propeller shaft. At this stage gas is admitted to the turbine, first bringing it to rest and later driving it in its ahead direction and thus producing an ahead drive on the propeller shaft.

It is preferred to operate the two clutches each through the medium of its own solenoid 18 (see Figure 3) and associated striker lever 19 and control switch 20 and to utilise the rotating clutch elements a, a', and b, b' to control the making and breaking of the circuit to the solenoids by each clutch embodying means to ensure closing of a switch 21 when the opposed pair of clutch elements are rotating in synchronism, this additional switch 21 being closed to complete the circuit to switch 20 when the inter-engaging parts of the clutch or coupling are aligned correctly. In this connection positive clutches e. g. dog clutches are as shown, preferred in order to obviate lag or lost motion due to relative rotation when employing friction clutches, and consequently before the appropriate solenoid is energised it is necessary to correctly align the inter-engaging elements of the coupling or clutch.

The means with each clutch for operating the switch 20 so as to close it when the two clutch elements are synchronised can comprise a differential gear embodying two gear wheels 22, 23 (see Figure 2) constantly in mesh with gear teeth 22', 23' on the periphery of the appropriate clutch element 2 or 3, these two gear wheels being coaxial and carrying inwardly directed concentric bevel gear-toothed annuli 24 and 25 respectively with which are constantly in mesh a pair of planet bevel pinions 26 and 27 carried by a spindle 28 passed diametrically through one end of a shaft 29 passed axially freely through the gear wheel 23, the other end of this shaft carrying a centrifugal governor 30 adapted to impart translative movement to a sleeve 31 on the shaft, this sleeve, e. g. acting as a bridge for opposed contacts 20a, 20b of the switch 20 arrangement being such that until the two clutch elements synchronise in speed the shaft 29 will be rotated with consequent separation of the contacts, but when synchronism occurs the shaft 29 will be brought stationary and the contacts 20a, 20b bridged thereby partially closing the circuit of the appropriate solenoid. It will be evident that in the arrangement as so far described the switch 20 will remain closed during the whole of the closed stage of its associated clutch and when a clutching operation is to be effected, the circuit is completed when, as aforesaid the separated elements of the de-clutched clutch are rotating in synchronism and correctly aligned, and this is achieved by a light sensitive cell device, e. g. a selenium cell 32 with each clutch, in co-operation with apertures 33 and 34 passing in the axial direction through the coupling elements a, e', (or b, b') near their peripheries, each cell being located on one side of the appropriate pair of elements, and a source of light 35 on the other side, whereby until the apertures in the clutch elements are aligned during a period including substantially a complete rotation of the clutch, the solenoid 18 will not be operated effectively. For this purpose the said apertures 34 can be of cylindrical form, and the other 33, i. e. the one directly opposed to the source of light, can be of triangular section with its apex slightly truncated to provide a small aperture directly opposed to the adjacent clutch element, whereby the wider end of this aperture receives the incident light from the said source. By this means a very restricted light transmission aperture is provided in one of the clutch elements and a relatively much larger aperture in the other clutch element, and when this very restricted light aperture becomes positioned opposite the larger aperture in the other clutch element, and there is no relative rotation between such clutch elements, the light will be directed upon the cell 32 and thereby through the medium of any suitable amplifying means 36 will operate the make-and-break device 21. This arrangement of apertures 33 and 34 enables the relative positions of the clutch elements to be adjusted within fine limits for obtaining a smooth response to the energising of the appropriate solenoid 18 the adjustment being obtained by the positional adjustment of the lamp 35.

To obviate keeping the circuit of each solenoid 18 closed following the completion of the cycle of operations to effect a reverse drive, each clutch has its striker arm or associated moving part connected to a switch 38 which is opened when a clutching operation has been completed, and closed when the clutch is de-clutched, this de-clutching being effected by hand.

Figure 4:
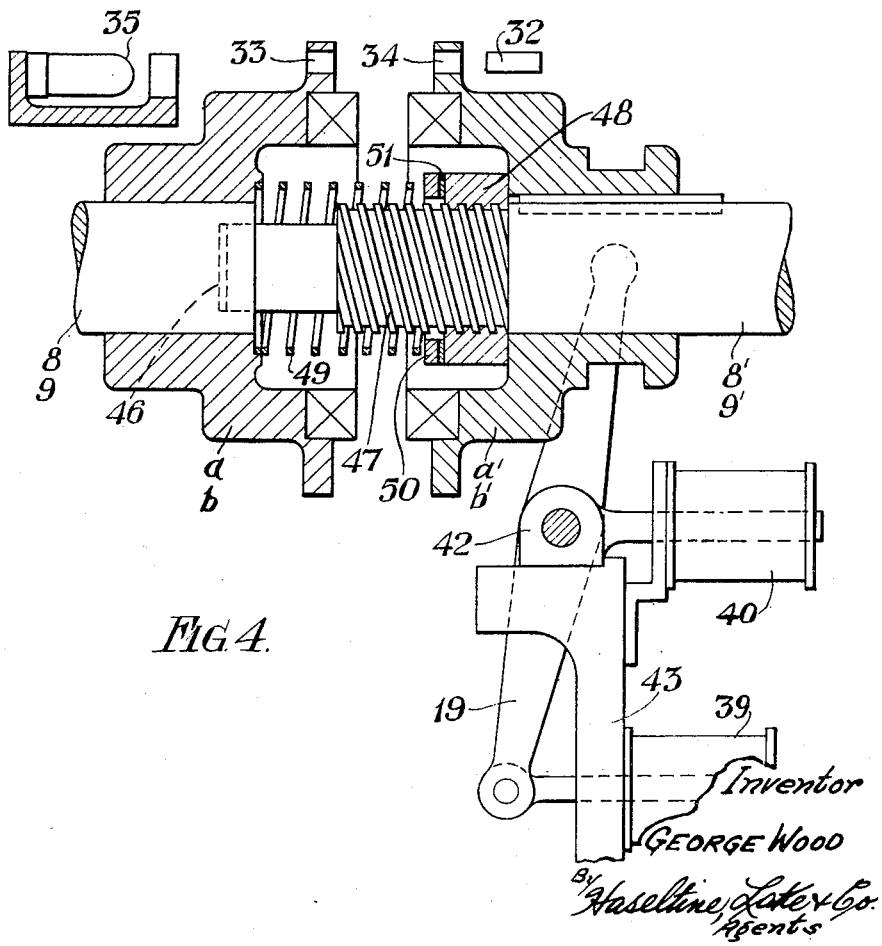
Figure 4 is a sectional elevation showing a modified form of the clutch synchronising means.

In the modification shown in Figures 4 and 5 each clutch 2 and 3 is operated by two solenoids 39 and 40, a main switch 41 being provided which is closed by hand or automatically as the air and gas valves 13 and 16 of Figure 1 are operated to accelerate the appropriate shaft (8' or 9') in the same direction as the co-operating shaft 8 or 9. The closing of the switch 41 will energise the solenoid 39 which will apply a force F to the clutch operating lever 19. Immediately the speeds of the clutch elements $a$ and $a'$ or $b$ and $b'$ are approximately equal, the force F becomes effective operating the lever 19 and moving the two clutch elements $a'$ and $b'$ closer to $a$ or $b$, i. e. in close contact therewith but not clutched. This initial displacement of the element $a'$ or $b'$ is utilised to close the switch 20 thereby rendering the selenium cell 32 effective in exciting the solenoid 40 when the two clutch elements are in correct relative phase for smooth engagement, whereupon the solenoid 40 induces the force P to move the lever 19 to complete full engagement of the clutch elements.

The lever 19, in this arrangement articulates on a pivot block 42 stationary upon the bracket 43 when the solenoid 39 is operated but slidable along such bracket when the solenoid 40 is operated, the lever 19 changing its fulcrum to its end which is driven by the solenoid 39 when the solenoid 40 is operated.

A suitable arrangement of clutch for use with the two solenoids has, as shown in Figure 4, its element $a$ or $b$ fixed to its shaft 8 or 9 and its other slidable element $a'$ or $b'$ splined to the shaft 8' or 9' which is continued concentrically through the hollow cylindrical part of the clutch element and engaged at its free end in a bore 46 formed in the opposed co-axial shaft, so that one shaft end is journalled in the other shaft end and is free to rotate relatively thereto.

The aforesaid prolonged part of the shaft carrying the slidable dog clutch element is screwed, e. g. formed with a multiple-start helical thread 47, from the inner annular part of the hollow cylindrical portion of the dog clutch element $a'$ for a distance extending slightly within the hollow cylindrical part of the other dog clutch element $a$, and upon this screwed portion of the shaft is threaded an annular nut 48 between which and a coiled compression spring 49 permanently fixed at one end to the non-slidable dog clutch element $a$ is interposed an annular ring 50, having an axial dimension appreciably smaller than the axial dimension of the aforesaid nut and being formed on its annular surface opposed to the nut with a lining 51 having a high co-efficient of friction so that frictional driving engagement can be made between the nut 48 and the annular ring 50. The said coiled compression spring 49 is permanently fixed at its appropriate end to this ring, so that when the shaft 8 or 9 carrying the relatively immovable dog clutch element $a$ is being rotated the said ring 50 is also rotated by reason of its connection through the medium of the coiled compression spring to the appropriate dog clutch element.

In the de-clutched position, the nut 48 forms a stop preventing the slidable dog clutch element $a'$ from moving into engagement with the other clutch element $a$, but when the shaft 8' carrying the slidable dog clutch element is rotated in the same direction as the other shaft 8, the first effect of trying to move the slidable dog clutch element into engagement with the other is to produce a pressure between the faces of the slidable dog clutch element and the nut 48. Immediately the speed of the shaft carrying the slidable dog clutch element exceeds that of the other shaft the effect of this pressure is to augment the spring load making the relative rotation of the aforesaid ring 50 rotate the nut 48 in the direction which will cause it to move towards the dog clutch element $a$ to which the springs is fixed, thus enabling the slidable clutch element $a'$ to move into engagement with the element $a$, whilst the relative speeds of the two shafts is sufficiently small to allow smooth movement into the engaged position.

The initial movement of $a'$ which produces the feeding of the nut 48 along the screw 47 is effected by the operation of the solenoid 39, and the final clutching operation by the solenoid 40.

I claim:

1. Reversible transmission gear for marine engines and the like in which the engine drives the propeller shaft or its equivalent through gearing, comprising the combination with the engine of an ahead shaft and a reverse shaft geared to the propeller shaft and incorporating gearing whereby one shaft is caused to rotate in a direction reverse to the other shaft, a clutch and associated electrically energized means for actuating it into the clutched position provided with each shaft, a governor with and distinctive to each clutch and with relatively rotatable governor control elements driven from the interengageable clutch elements of the associated clutch, a switch with each governor, a circuit with and distinctive to each said switch and associated electrically energized means, each switch being actuated from its associated governor to bring the said electrically energized means into circuit when the appropriate declutched clutch cooperating elements are rotating in synchronism, means to declutch each clutch, and means for bringing the declutched elements of the clutches into synchronous rotation comprising means for retarding the engine and bringing its direction of rotation into conformity with the direction of rotation of the propeller or equivalent shaft due to the way of the ship.

2. Reversible transmission gear for marine engines and the like as claimed in claim 1, wherein there are provided gear wheels on the inter-engageable clutch elements, a differential gear with each clutch driven off the said gear wheels of the said clutch elements, a shaft driving each said governor and receiving rotation from planet members of the differential gear, the arrangement being such that when the clutch elements are out of synchronism the planet members have a movement of translation about the axis of the associated said shaft and by reason of the rotation of the said shaft maintain the governor in the contact broken position of the associated said switch but returns the governor to the contact closed position consequent upon such movement of translation being arrested by reason of the two clutch elements rotating in synchronism.

3. In reversible transmission gear for marine engines and the like in which the engine drives the propeller shaft or its equivalent through gearing, clutches incorporated with said gearing for obtaining a reverse in direction of rotation of the propeller or equivalent shaft whilst having a unidirectional normal driving rotation of the power shaft of the engine, electrically energised devices for actuating the said clutches, a source of electrical energy and distinctive circuits for the said electrically energised devices appropriate to said clutch, means for automatically closing the circuit of said electrically energised devices only when the appropriate de-clutched clutch elements of the transmission are running in synchronism, said electrically energised devices comprising with the two co-operating clutch elements of each clutch a pair of electrically energised members with means to automatically bring one of them into circuit when initiating a clutching operation of the associated clutch so as to advance the de-clutched elements of the appropriate clutch toward each other, and means to bring the other electrically energised member into circuit consequent upon the latter-mentioned clutch elements being advanced a predetermined distance towards each other in order that the second energised member will complete the clutching operation when the two clutch elements are rotating truly in synchronism.

4. Reversible transmission gear for marine engines and the like in which the engine drives the propeller shaft or its equivalent through gearing, comprising the combination with the engine of an ahead shaft and a reverse shaft geared to the propeller shaft and incorporating gearing whereby one shaft is caused to rotate in a direction reverse to the other shaft, a clutch with each shaft, electrically energised means for moving each clutch into the clutched position, a governor with each clutch with elements driven from the opposed elements of the associated clutch, a switch with each governor, a source of electrical energy and a distinctive circuit for each switch and associated electrically energised means, each switch being actuated from its associated governor to bring the said electrically energised means into circuit when the appropriate clutch cooperating elements rotating in synchronism, and means for bringing the clutch elements into synchronous rotation comprising means for retarding the engine and bringing its direction of rotation into conformity with the direction of rotation of the propeller or equivalent shaft due to the way of the ship, and the inclusion with the circuit of the electrically energised means of a make-and-break device adapted to be closed only when the clutch elements are rotating in true synchronism, the said means comprising with each clutch a light sensitive cell and a source of light between which the two clutch elements are rotated and apertures in the clutch elements, which, when aligned will expose the light sensitive cell to the source of light, and electrically energised device for operating the said make-and-break device and an amplifier connecting the light sensitive cell to said electrically energized device.

5. In reversible transmission gear for marine engines and the like in which the engine drives the propeller shaft or its equivalent through gearing, clutches incorporated with said gearing for obtaining a reverse in direction of rotation of the propeller or equivalent shaft whilst having a unidirectional normal driving rotation of the power shaft of the engine, electrically energised devices for actuating the said clutches, a source of electrical energy and a distinctive circuit for the electrically energised devices appripriate to each clutch, means automatically closing the circuit of said electrically energised devices only when the appropriate clutch elements of the transmission are running in synchronism said electrically energised devices comprising with the two co-operating clutch element of each clutch a pair of electrically energised members with means to automatically bring one of them into circuit when effecting a de-clutching operation of the clutch establishing the drive from the power unit to the propeller shaft so as to advance the previously de-clutched elements of the appropriate clutch toward each other, means to bring the other electrically energised member into circuit consequent upon the latter-mentioned clutch elements being advanced a predetermined distance towards each other in order that the second energised member will complete the clutching operation when the two clutch elements are rotating truly in synchronism, and the inclusion with the circuit of the electrically energised means of a make-and-break device adapted to be closed only when the clutch elements are rotating in true synchronism, the said means comprising with each clutch a light sensitive cell and a source of light between which the two clutch elements are rotated and apertures in the clutch elements which, when aligned will expose the light sensitive cell to the source of light, and an amplifier connecting the light sensitive cell to an electrically energised device for operating the said make-and-break device.

6. Reversible transmission gear for marine engines and the like in which the engine drives the propeller shaft or its equivalent through gearing, comprising the combination with the engine of an ahead shaft and a reverse shaft geared to the propeller shaft and incorporating gearing whereby one shaft is caused to rotate in a direction reverse to the other shaft, a clutch with each shaft, electrically energised means for moving each clutch into the clutched position, a governor with each clutch with elements driven from the opposed elements of the associated clutch, a source of electrical energy for said electrically energised means and a circuit distinctive to the said electrically energised means appropriate to each clutch, a switch with each governor, each switch being actuated from its associated governor to bring the said electrically energised means into the circuit thereof when the appropriate clutch co-operating elements are rotating in synchronism, and means for bringing the clutch elements into synchronous rotation comprising means operated from said shaft for building up a store of energy adapted at the appropriate moment to be released to take over the drive of the engine for reversing its direction of rotation.

7. Reversible transmission gear for marine engines and the like in which the engine drives the propeller shaft or its equivalent through gearing, comprising the combination with the power unit of an ahead shaft and a reverse shaft geared to the propeller shaft and incorporating gearing whereby one shaft is caused to rotate in a direction reverse to the other shaft, a clutch with each shaft, electrically energised means for moving each clutch into the clutched position, a governor with each clutch with elements driven from the opposed elements of the associated clutch, a switch with each governor, each switch being actuated from its associated governor to bring the said electrically energised means into circuit when the appropriate clutch co-operating elements are rotating in synchronism, and means for bringing the clutch elements into synchronous rotation comprising an air compressor with high and low pressure sides and driven from the engine shaft and means to isolate the engine from its gas supply and to connect the high pressure side of the compressor to the said gas supply for the engine to decelerate the engine, and thereafter to divert the gas to the low pressure side of the compressor to reverse the power unit, when a reversing operation is required, and means for releasing the energy due to the compressed gas arising out of the drive of the power unit on the compressor for applying a reverse drive to the power unit.

GEORGE WOOD.

REFERENCES CITED

The following references are of record in the file of this patent:

UNITED STATES PATENTS

| Number | Name | Date |
|---|---|---|
| 1,364,325 | Sitney | Jan. 4, 1921 |
| 1,389,382 | Rigsby | Aug. 30, 1921 |
| 1,680,209 | Emmett | Aug. 7, 1928 |
| 1,686,827 | Maag | Oct. 9, 1928 |
| 1,701,403 | Coykendall | Feb. 5, 1929 |
| 1,846,894 | Morgan | Feb. 23, 1932 |
| 2,070,341 | Sawis | Feb. 9, 1937 |
| 2,126,547 | Fottinger | Aug. 9, 1937 |
| 2,252,042 | Sinclair | Aug. 12, 1941 |
| 2,339,976 | Brown | Jan. 25, 1944 |
| 2,373,453 | Brunken | Apr. 10, 1945 |

FOREIGN PATENTS

| Number | Country | Date |
|---|---|---|
| 171,030 | Great Britain | Nov. 10, 1921 |
| 396,622 | Great Britain | Aug. 10, 1933 |